(12) United States Patent
Nishizawa et al.

(10) Patent No.: US 7,346,425 B2
(45) Date of Patent: Mar. 18, 2008

(54) CONTROL DEVICE FOR USE IN INJECTION MOLDING MACHINE

(75) Inventors: Makoto Nishizawa, Numazu (JP);
Yutaka Yamaguchi, Tagata-gun (JP);
Ryoji Tominaga, Hoffman Estates, IL (US); Yasumasa Sugiyama, Numazu (JP); Hiroshi Katsuta, Gotemba (JP); Kunihiko Noda, Numazu (JP); Kiyoshi Inoue, Numazu (JP); Hirotaka Sekino, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/410,855

(22) Filed: Apr. 26, 2006

(65) Prior Publication Data

US 2006/0247822 A1   Nov. 2, 2006

(30) Foreign Application Priority Data

Apr. 27, 2005   (JP)   ............................. 2005-129500
Apr. 27, 2005   (JP)   ............................. 2005-129501

(51) Int. Cl.
*B29C 45/00* (2006.01)
(52) U.S. Cl. ..................................... 700/200; 264/40.1
(58) Field of Classification Search ........ 700/200–205; 264/40.1
See application file for complete search history.

(56) References Cited

U.S. PATENT DOCUMENTS

| | | | | |
|---|---|---|---|---|
| 5,296,179 A | * | 3/1994 | Kamiguchi et al. | 264/40.1 |
| 5,470,218 A | * | 11/1995 | Hillman et al. | 425/144 |
| 5,611,975 A | * | 3/1997 | Kamiguchi et al. | 264/40.1 |
| 5,733,486 A | * | 3/1998 | Hayasi et al. | 264/40.1 |
| 5,783,221 A | * | 7/1998 | Takizawa et al. | 425/143 |
| 6,015,515 A | * | 1/2000 | Fujita | 264/40.1 |
| 6,066,276 A | * | 5/2000 | Kamiguchi et al. | 264/40.7 |
| 6,073,059 A | | 6/2000 | Hayashi et al. | |

(Continued)

FOREIGN PATENT DOCUMENTS

DE        10246925 A1      4/2003

(Continued)

OTHER PUBLICATIONS

Office Action (in German) issued on Oct. 16, 2007, in counterpart German Patent Application No. 10 2006 019 684.8-51.

(Continued)

*Primary Examiner*—Zoila Cabrera
(74) *Attorney, Agent, or Firm*—DLA Piper US LLP (57) ABSTRACT

A control device of an injection molding machine which injects a molten resin from an injection nozzle is provided with a display section in which a touch panel is disposed, and a human-machine interface section equipped with a general-purpose operating system, and the human-machine interface section is provided with at least a storage section to store set values which are various molding conditions for each mold article and a control section which controls the display of the display section. The interface section displays, on the display section, a main screen to change settings for the molding conditions stored in the storage section and a subscreen to display indications such as monitors, and also constantly displays a change switch for a change of the screen in a fixed region of the display section.

4 Claims, 11 Drawing Sheets

U.S. PATENT DOCUMENTS

| | | | |
|---|---|---|---|
| 6,325,954 B1 * | 12/2001 | Sasaki et al. | 264/40.1 |
| 6,381,512 B1 * | 4/2002 | Saitou et al. | 700/200 |
| 6,618,041 B2 * | 9/2003 | Nishizawa | 345/173 |
| 6,925,354 B2 | 8/2005 | Mörwald et al. | |
| 6,931,300 B2 * | 8/2005 | Yamazaki et al. | 700/200 |
| 2006/0157880 A1 | 7/2006 | Hehl | |
| 2007/0007683 A1 * | 1/2007 | Amano | 264/40.1 |

FOREIGN PATENT DOCUMENTS

| | | |
|---|---|---|
| DE | 1306188 A1 | 5/2003 |
| DE | 10334153 A1 | 2/2005 |
| JP | 2001-191383 | 7/2001 |

OTHER PUBLICATIONS

English Translation of Office Action issued on Oct. 16, 2007, in counterpart German Patent Application No. 10 2006 019 684.8-51.

English translation of German Abstract published under German Publication No. 10334153.

English translation of German Abstract published under German Publication No. 10246925.

German Office Action issued in counterpart DE Patent Application No. 10 2006 019 598.1-51 on Oct. 16, 2007.

English Translation of German Office Action issued in counterpart DE Patent Application No. 10 2006 019 598.1-51 on Oct. 16, 2007.

* cited by examiner

A: 00/10/21 10:30 | List | Temperature | Production 9999 | Clamp | Inject | Option | Monitor | Record | Tool Title 3 — Operating Tabs: Actual measurement | Operation monitor | Monitor table | Production | History | Waveform | Maintenance | Memory 0 changed | Calculator

| | HEN | HN | H1 | H2 | H3 | H4 | H5 | Under hopper | Oil temperature |
|---|---|---|---|---|---|---|---|---|---|
| Detection °C | 523.2 | 505.4 | 902.4 | 542.0 | 512.0 | 511.8 | 315.0 | 505.6 | 11 |
| Deviation °C | 0.0 | 0.0 | 0.0 | 0.0 | 0.0 | 0.0 | 0.0 | 0.0 | |
| Conductivity % | 98 | 99 | 91 | 0 | 0 | 96 | 95 | | |

| | | |
|---|---|---|
| Injection | 0.00 s | Screw position 27.54 s | Mold clamping force 5157 kN |
| Cool | 0.00 s | Die plate 7.4 s | Injection pressure/back pressure 11.9 MPa |
| Medium | 0.00 s | Extrusion position 1.06 s | Screw rotation speed 234 min⁻¹ |

Sub-tabs: Barrel temperature | Barrel PID | Mold temperature 1 | Mold temperature 2 | Mold temperature 3 | Mold temperature 4 | Mold temperature 5

| | HEN | HN | H1 | H2 | H3 | H3 | H3 | Under hopper |
|---|---|---|---|---|---|---|---|---|
| Setting °C | 400.0 | 400.0 | 400.0 | 400.0 | 400.0 | 400.0 | 400.0 | 0.0 |
| Wire break | | | | | | | | |
| Detection °C | 301.5 | 283.7 | 680.7 | 320.3 | 290.3 | 290.1 | 315.1 | 283.9 |
| Deviation °C | 0.0 | 0.0 | 0.0 | 0.0 | 0.0 | 0.0 | 0.0 | 0.0 |
| Conductivity % | 89 | 90 | 83 | 91 | 87 | 87 | 86 | 86 |
| Allowable °C± | 99.9 | 99.9 | 99.9 | 99.9 | 99.9 | 5.0 | 5.0 | 5.0 |
| Alarm selection | No | No | No | No | No | No | Yes | Yes |

Right panel:
- Set shift operation condition — Off
- Time left 002 hours 00 minutes
- Prevent cold activation — Time left 15 minutes
- Simultaneous temperature increase — No
- Operation oil temperature increase — Temperature increasing 30°C
- ◀ Display setting Legend: HEN, HN, H1, H2, H3, H4, H5, Under hopper Bottom: Actual temperature graph | Deviation chart △ | Heater current | Blower setting
Graph: 10min/div, scale +20 to −20

CONTROL DEVICE FOR USE IN INJECTION MOLDING MACHINE

CROSS-REFERENCE TO RELATED APPLICATIONS

This application is based upon and claims the benefit of priority from prior Japanese Patent Applications No. 2005-129500, filed Apr. 27, 2005; and No. 2005-129501, filed Apr. 27, 2005, the entire contents of both of which are incorporated herein by reference.

BACKGROUND OF THE INVENTION

1. Field of the Invention

The present invention relates to a control device for use in an injection molding machine, and more particularly, to a control device for use in an injection molding machine comprising a human-machine interface section.

2. Description of the Related Art

An injection molding machine is provided with a cylindrical barrel and a hopper into which is put a synthetic resin material.

The barrel has an injection nozzle provided at the tip thereof, and has an injection screw provided therein in a rotatable manner and in a manner to be able to move back and forth with respect to the injection nozzle.

The hopper is disposed in the rear of the barrel, and sends into the barrel the synthetic resin material which has been put in.

The barrel heats and melts the synthetic resin material. Further, after the injection nozzle is placed against a nozzle inlet of a metal mold, the barrel extrudes the heated molten resin to the tip by the rotation of the injection screw, and injects it from the injection nozzle to the metal mold.

The metal mold is held in a closed state by a mold open/close mechanism, and has a cavity filled with the molten resin injected from the injection nozzle.

Then, the injection nozzle is separated from the mold, and the mold is released from the mold open/close mechanism. Thus, a molded article is taken out from the mold.

A control device which controls such an injection molding machine is provided with a human-machine interface section to control an operation unit and a display section.

When operated by the operator, the human-machine interface section sets numerical data on speed, pressure, time and the like concerning processes such as injection, opening/closing of the mold, extrusion and measurement. Further, the human-machine interface section displays the set numerical data as set values on the display section.

The display section displays a main screen used to set the set values, and a subscreen which indicates a monitor value and the like.

The display section selects, by a direct key of hardware, a screen group to be displayed on the main screen, and changes the screens of the same screen group by a function button provided at the bottom of a display screen. For the subscreen, the screens are changed by a screen selection button disposed in a menu screen.

Thus, when the screens are changed in the subscreen, the screen has to be once returned to the menu screen before operating the screen selection button, which requires wasteful time to change the screen.

On the other hand, before molding, the human-machine interface section sequentially sets into a memory the set values by use of setters while changing the screen. After the molding is started, the human-machine interface section changes the set value for the each process as necessary to adjust optimum conditions while checking the quality of a molded article. However, the respective setters are not disposed in the same screen in many cases.

Therefore, each time, the human-machine interface section needs to change setting after searching for the necessary setter while changing the screen of the display section, thus requiring some time to change the screen.

BRIEF SUMMARY OF THE INVENTION

The present invention provides a control device for use in an injection molding machine capable of reducing time required to change a screen displayed on a display section during setting of various molding conditions.

In a control device for use in an injection molding machine in one aspect of the present invention, the injection molding machine injects a molten resin produced by heating and melting a synthetic resin material from an injection nozzle into a mold while measuring the molten resin, and the control device comprises: a display section in which a touch panel is disposed on a display screen; and a human-machine interface section equipped with a general-purpose operating system, the human-machine interface section being provided with at least a storage section to store set values which are various molding conditions for each mold article and a control section which controls the display of the display section, the human-machine interface section displaying, on the display section, a main screen to change settings for the molding conditions stored in the storage section and a subscreen to display indications such as monitors, and also constantly displaying a change switch for a change of the screen in a fixed region of the display section.

The main screen to change the setting for the molding conditions and the subscreen to display the indications such as monitors are displayed, and the change switch is constantly displayed, so that the changing of the screen during the condition setting is facilitated by the operation of the change switch, thus reducing time required for the changing.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will hereinafter be described with reference to the drawings.

In this embodiment, the present invention applied to a control device for use in an electrically driven injection molding machine is explained.

Figure 1:
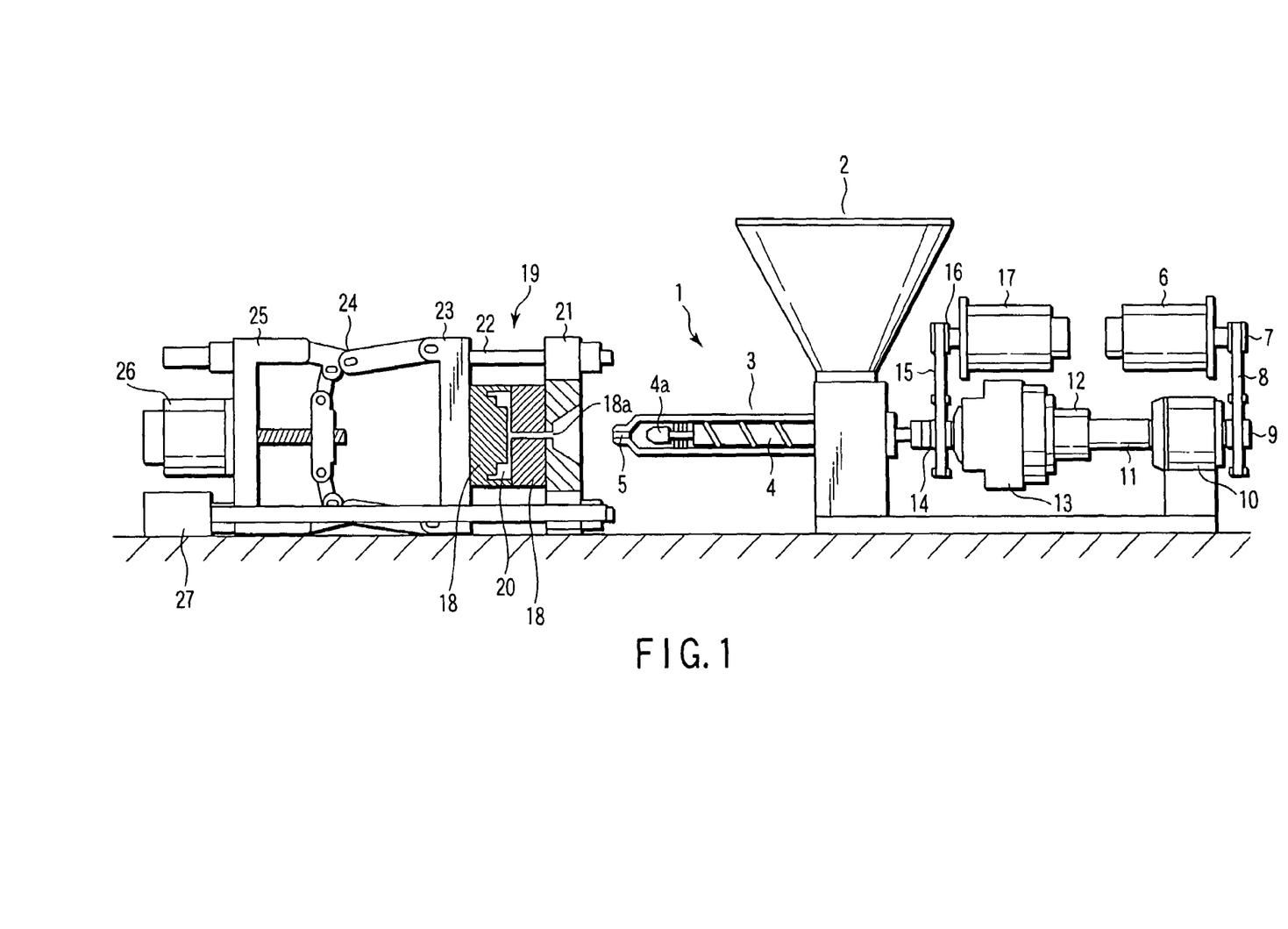
FIG. 1 is a diagram showing the configuration of an electrically driven injection molding machine in one embodiment of the present invention.

As shown in FIG. 1, in an injection molding machine main body 1, there is disposed an injection screw 4 in a cylindrical barrel 3 equipped with a hopper 2.

The injection screw 4 is rotatable in the barrel 3 and movable forward and backward.

The barrel 3 communicates with the hopper 2 at the rear part thereof. The hopper 2 feeds a synthetic resin material into the barrel 3.

The barrel 3 is provided with, at its tip, an injection nozzle 5 to inject the molten synthetic resin material.

On the outer periphery of the barrel 3, a plurality of heaters is arranged at predetermined intervals.

Each of the heaters heats the outer periphery of the barrel 3, and melts the synthetic resin material fed from the hopper 2.

The temperature of the barrel 3 during heating is controlled so that the temperature in the rear part may be the lowest and the temperature may become higher from the rear part to the front part. Owing to this temperature control, the injection nozzle 5 injects sufficiently molten resin.

The injection screw 4 is rotationally driven and operated back and forth by an injection servomotor 6. That is, the injection servomotor 6 transmits its rotation to a ball screw shaft 11 via a transmission mechanism composed of a pulley 7, a timing belt 8 and a timing pulley 9.

The ball screw shaft 11 is rotatably provided in a servo bracket 10. The ball screw shaft 11 is screwed in a ball nut 12.

The ball nut 12 is rotatably coupled to a thrust box 13.

The injection screw 4 has its rear end rotatably coupled to the thrust box 13 via an unshown S-shaft and bearing.

The S-shaft is rotatably coupled to the thrust box 13. The S-shaft attaches a timing pulley 14. 17 denotes a measurement servomotor, and this measurement servomotor attaches a pulley 16 to a rotating shaft.

A timing belt 15 is built between the timing pulley 14 and the pulley 16.

The timing pulley 14, the timing belt 15 and the pulley 16 constitute a transmission mechanism.

The measurement servomotor 17 moves the injection screw 4, material which is to be injected forward, determining an amount of the molted resin.

The measurement servomotor 17 transmits its rotation to the S-shaft via the transmission mechanism to rotate the injection screw 4.

The position for the injection screw 4 to move forward is decided in accordance with the amount of the molten resin to be injected.

At the forward position of the barrel 3, there are metal mold halves 18, and a device 19 for opening/closing and clamping the metal mold halves 18.

When the molten resin is injected from the injection nozzle 5, the injection nozzle 5 is pressed against a nozzle inlet 18a of one metal mold half 18.

In this state, the injection screw 4 moves its tip 4a forward to inject the molten resin produced in the barrel 3 from the injection nozzle 5. The injected molten resin is filled into a cavity 20 defined by the metal mold halves 18.

The device 19 has a fixing plate 21 that supports one of the metal mold halves 18. A movable plate 23 is provided, which holds a tie bar 22 that in turn supports the fixing plate 21. The movable plate 23 can move toward and away from the fixing plate 21.

The device 19 attaches the moving plate 23 to a toggle mechanism support plate 25 via a toggle-type clamping mechanism 24.

The toggle mechanism support plate 25 attaches a clamping servomotor 26 to drive the clamping mechanism 24.

27 denotes a mold thickness adjustment mechanism, and this mold thickness adjustment mechanism 27 adjusts the mold thickness when the clamping mechanism 24 carries out clamping.

In the electrically driven injection molding machine having such a configuration, the clamping servomotor 26 is first driven. This starts the closing of the metal mold halves 18.

Furthermore, the injection nozzle 5 of the barrel 3 is pressed against the nozzle inlet 18a of the metal mold halves 18.

Next, the measurement servomotor 17 rotates and advance the injection screw 4, determining an amount of the molted resin to be injected.

Subsequently, the injection servomotor 6 rotates the injection screw 4 to inject the molten resin.

The barrel 3 injects the molten resin from the injection nozzle 5, and fills the molten resin into the cavity 20 of the metal mold halves 18.

Figure 2:
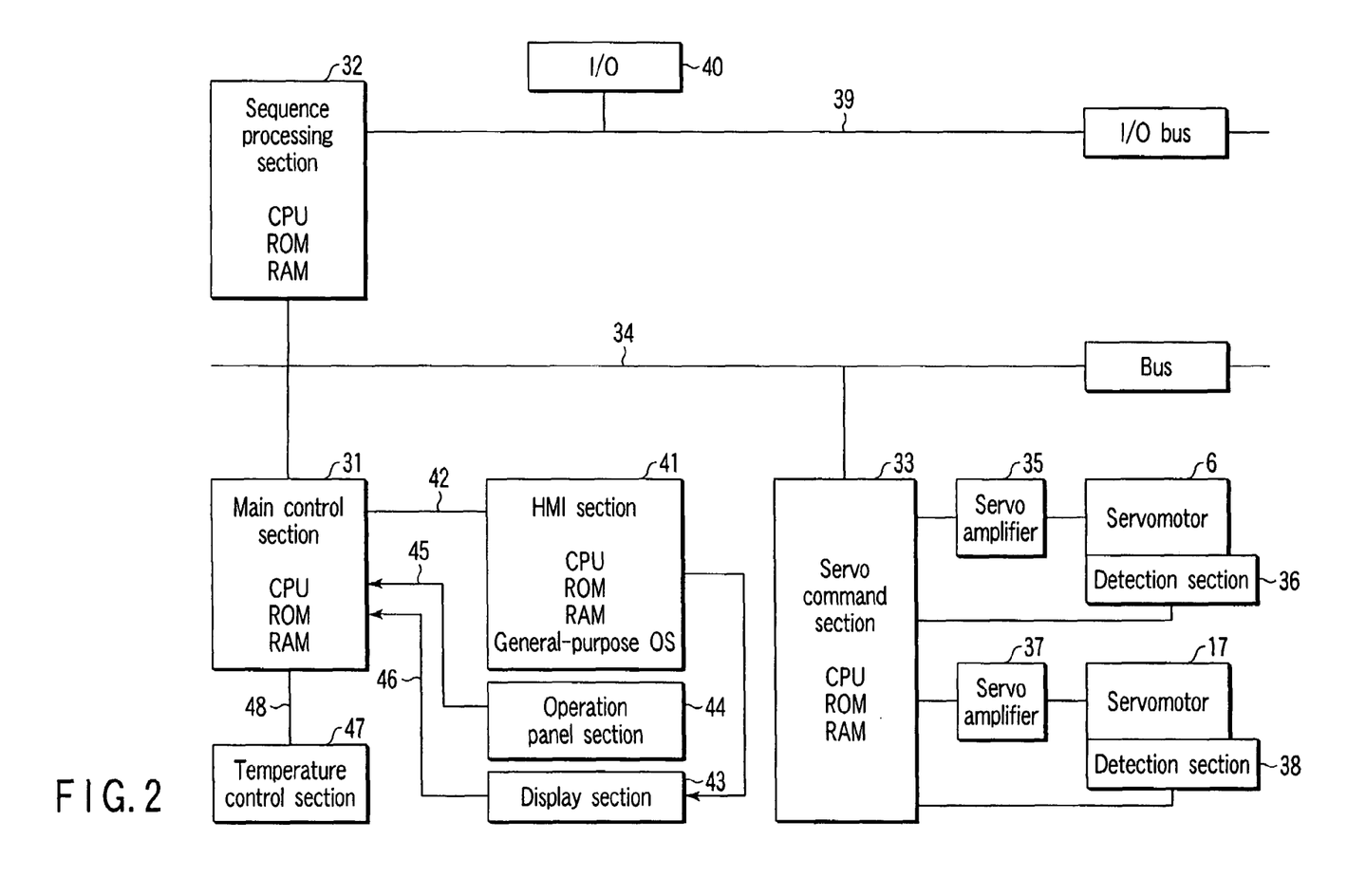
FIG. 2 is a block diagram showing the configuration of a control device for use in an injection molding machine main body in the embodiment.

As shown in FIG. 2, the control device for use in the injection molding machine main body 1 comprises a main control section 31 which controls sections in the device, a sequence processing section 32 and a servo command section 33.

The main control section 31 has a CPU, a ROM and a RAM, and manages and monitors the injection molding machine main body 1.

The sequence processing section 32 has a CPU, a ROM and a RAM, and controls the operational sequence of the injection molding machine main body 1.

The servo command section 33 has a CPU, a ROM and a RAM, and controls the injection servomotor 6 and the measurement servomotor 17.

The main control section 31, the sequence processing section 32 and the servo command section 33 are electrically connected to each other by a bus line 34.

The servo command section 33 controls a servo amplifier 35 to drive the injection servomotor 6. The rotation and current value of the injection servomotor 6 are detected by a detection section 36.

The servo command section 33 takes in a signal from the detection section 36 to detect the movement position and rotation speed of the injection screw 4 and the current value of the motor.

Furthermore, the servo command section 33 performs feedback control on the basis of the movement position and rotation speed and the current value of the motor which have been detected, and controls the injection servomotor 6.

Moreover, the servo command section 33 controls a servo amplifier 37 to drive the measurement servomotor 17. The rotation and current value of the measurement servomotor 17 are detected by a detection section 38.

The servo command section 33 takes in a signal from the detection section 38 to detect the movement position and rotation speed of the injection screw 4 and the current value of the motor.

Furthermore, the servo command section 33 performs feedback control on the basis of the movement position and rotation speed and the current value of the motor which have been detected, and controls the measurement servomotor 17.

An I/O 40 and the like are electrically connected to the sequence processing section 32 via an I/O bus 39.

The main control section 31 comprises a communication interface section, and a human-machine interface (HMI) section 41 is connected to the communication interface section by a LAN 42 such as Ethernet (registered trademark).

The HMI section 41 comprises a CPU, a ROM, a RAM and a general-purpose operating system (OS).

The HMI section 41 comprises, for example, a personal computer. A display section 43 in which a touch-panel is disposed on a screen of a liquid crystal display is connected to the HMI section 41, and the HMI section 41 controls the display of this display section 43.

An operation panel 44 provided with a plurality of mechanical operation switches is connected to the main control section 31 by a cable 45.

The touch panel of the display section 43 is connected to the main control section 31 by a cable 46.

A temperature control section 47 is connected to the main control section 31 by a cable 48. The temperature control section 47 controls the heating temperature of the plurality of heaters arranged on the outer periphery of the barrel 3.

Figure 3:
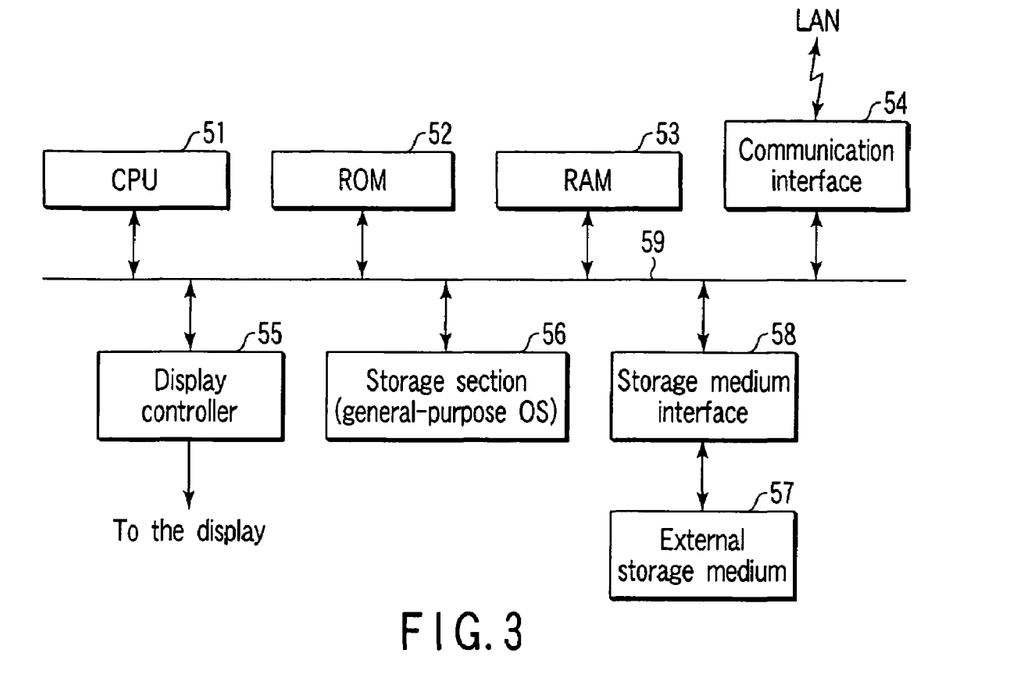
FIG. 3 is a block diagram showing the configuration of an HMI section of the control device in the embodiment.

As shown in FIG. 3, the HMI section 41 is provided with a CPU 51 forming a control section main body, a ROM 52 storing program data, a RAM 53 provided with a memory and the like used for data processing, and a communication interface 54 which communicates with the main control section 31 via the LAN 42.

The HMI section 41 is also provided with a display controller 55 which controls the display of the display section 43, a storage section 56 storing the general-purpose OS for which a nonvolatile storage medium such as a Compact Flash Memory (registered trademark) card or a hard disk is used, and a storage medium interface 58 which is connected with an external storage medium 57 such as an optical disk and which communicates data with the external storage medium 57.

The CPU 51, the ROM 52, the RAM 53, the communication interface 54, the display controller 55, the storage section 56 and the storage medium interface 58 are electrically connected to each other by a bus line 59.

The HMI section 41 controls the display of the display section 43 via the display controller 55.

Key signals from the touch panel of the display section 43 are input to the main control section 31, and the main control section 31 transmits the signal necessary in the HMI section 41 among the input key signals to the HMI section 41 via the LAN 42.

Figure 4:
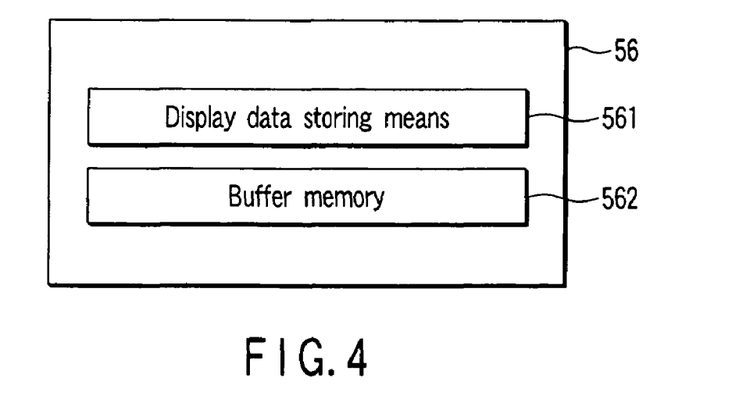
FIG. 4 is a diagram showing the configuration of an essential memory provided in a storage section of the HMI section in the present invention.

As shown in FIG. 4, the storage section 56 comprises display data storing means 561 for storing, in the storage medium, display data to be displayed on the display section 43, and a buffer memory 562 which temporarily stores a set value of a copy source when copying the set value.

It is to be noted that the display data storing means 561 and the buffer memory 562 may be formed in the external storage medium 57.

The HMI section 41 is provided with means for temporarily storing in the buffer memory 562 the set value displayed in a setting window I described later when a copy button provided in the setting window I is touched.

Furthermore, the HMI section 41 is provided with copying means. In a case where the unit of a set value in a set value display region to be touched next is the same as the unit of a set value stored in the buffer memory 562 and where the set value stored in the buffer memory 562 is within an allowable range of the set value in the set value display region to be touched next, the copying means copies the set value stored in the buffer memory 562 as the set value in the set value display region when the relevant set value display region is touched.

In the injection molding machine having such a configuration, the display section 43 displays a screen to select a setting of molding conditions when one mold article is to be molded.

Figure 5:
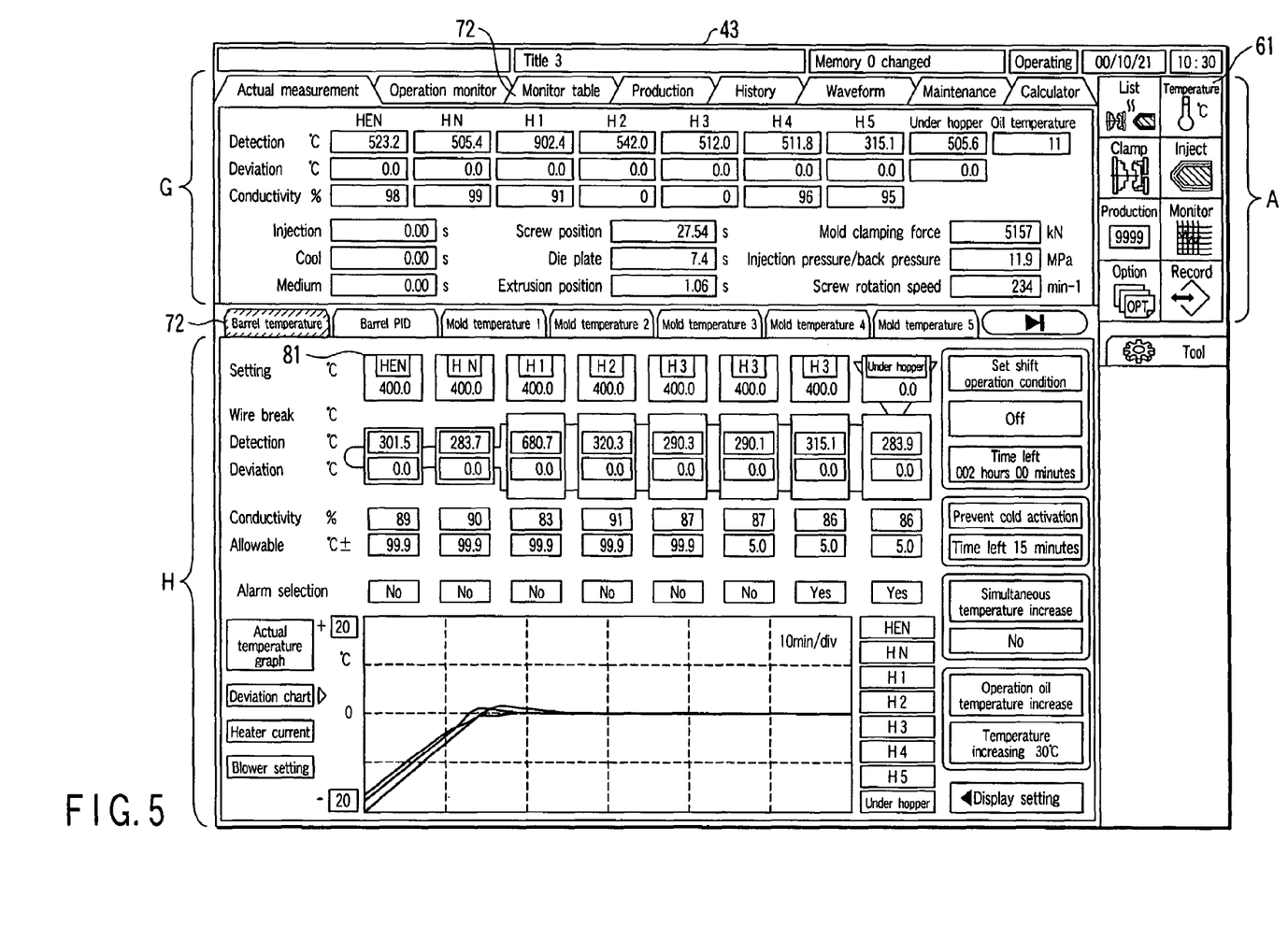
FIG. 5 is a diagram showing a display screen during setting of molding conditions in a display section in the embodiment.

In this state, if the touch panel of the display section 43 is touched to select a setting of molding conditions, the display section 43 displays a screen to set the molding conditions as shown in FIG. 5.

In this display screen, a change switch to change the screen is always displayed in a fixed region A. The displayed change switch includes buttons such as "List", "Temperature", "Clamp", "Inject", "Production", "Monitor", "Option" and "Record".

Thus, the display section 43 is provided with the change switch to change the display screen and this change switch is always displayed in the fixed region A of the display screen, so that the display screen can be changed to a designated screen at any time by a touch operation of the change switch.

Therefore, this control device can reduce the time required to change the screen of the display section 43.

FIG. 5 shows the display screen of the display section 43 after a button 61 of the "Temperature" has been touched.

The display section 43 displays, in an upper part of its display screen, a subscreen G to display indications such as monitors, and in a lower part thereof, a main screen H to change the setting of molding conditions. Tags 72 are displayed in the subscreen G and the main screen H.

In the main screen H of the display section 43, there are displayed the tags "Barrel temperature", "Barrel PID", "Mold temperature 1", "Mold temperature 2", . . . , "Mold temperature 5", and a set value display region 81 to display set values that have been set is provided under the tags.

FIG. 5 shows a state where the tag "Barrel temperature" is selected. Moreover, this set value display region 81 is constituted of pick switches.

Figure 6:
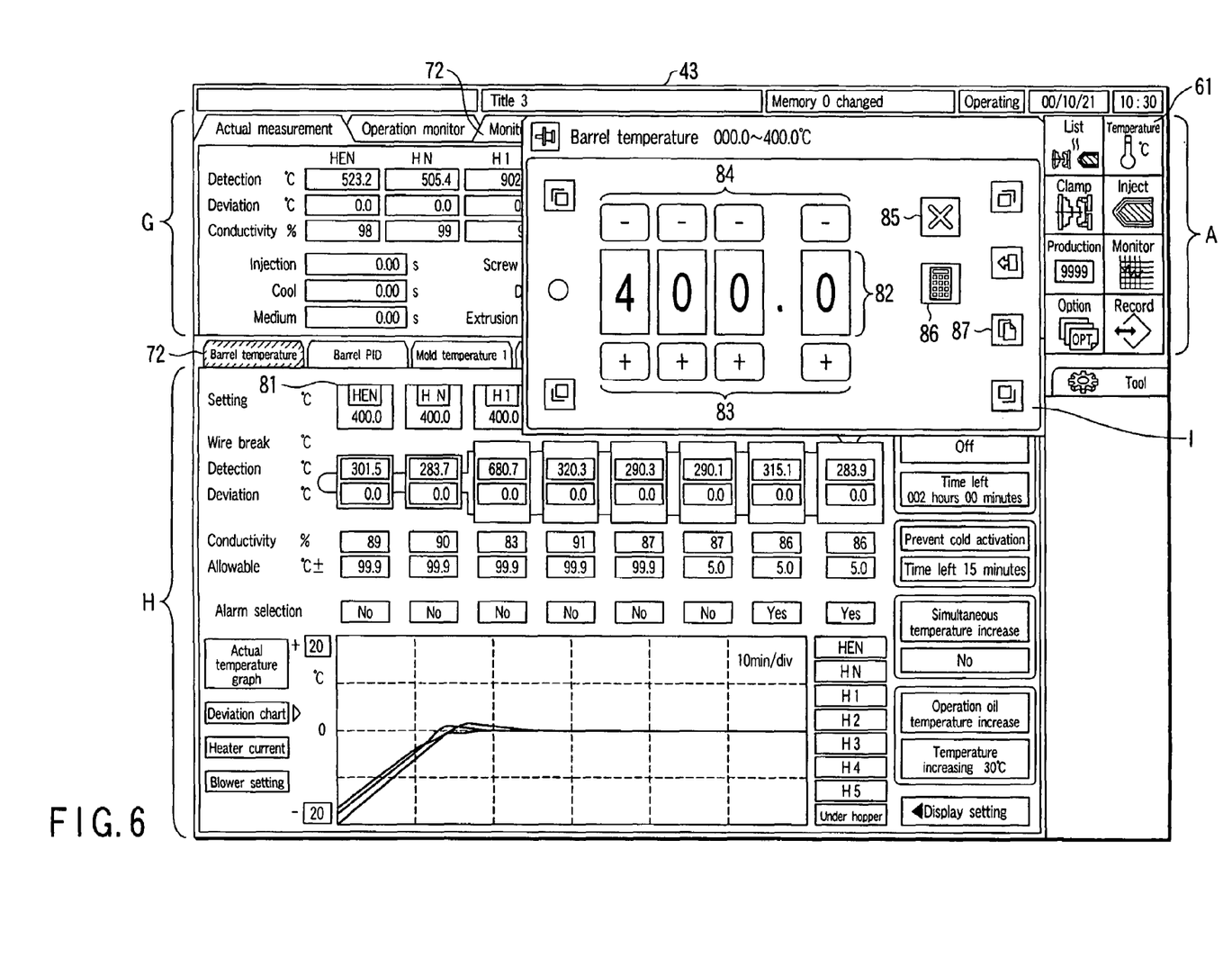
FIG. 6 is a diagram showing a changed screen when the setting of a barrel temperature is selected in the display screen shown in FIG. 5.

When the "Barrel temperature" is to be set, the pick switch in the set value display region 81 which displays the set value of the barrel temperature is touched. Thus, the setting window I to set the set values pops up, as shown in FIG. 6.

In the setting window I, there are displayed an indicating section 82 to indicate the set value, an up-key 83, a down-key 84, an "X" button 85, a numeric keypad input switch button 86 and a copy button 87.

The up-key 83 increments digits of the set value indicated in the indicating section 82 one by one. The down-key 84 counts the digits of the set value indicated in the indicating section 82 one by one.

Figure 7:
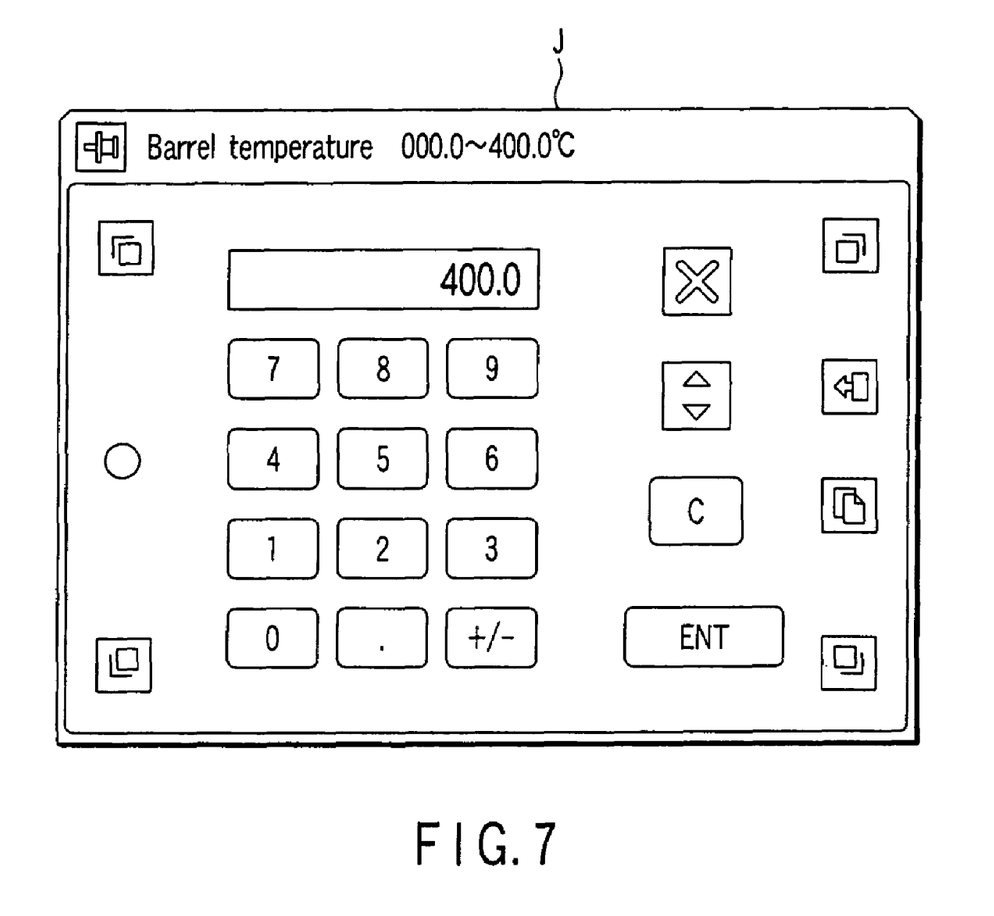
FIG. 7 is a diagram showing a numeric keypad input window screen when a numeric keypad input switch button is touched in the display screen shown in FIG. 6.

The "X" button 85 is a button to close the setting window I. The numeric keypad input switch button 86 is a button to cause a numeric keypad input window J as shown in FIG. 7 to pop up. The copy button 87 is a button to copy the set value indicated in the indicating section 82.

Figure 8:
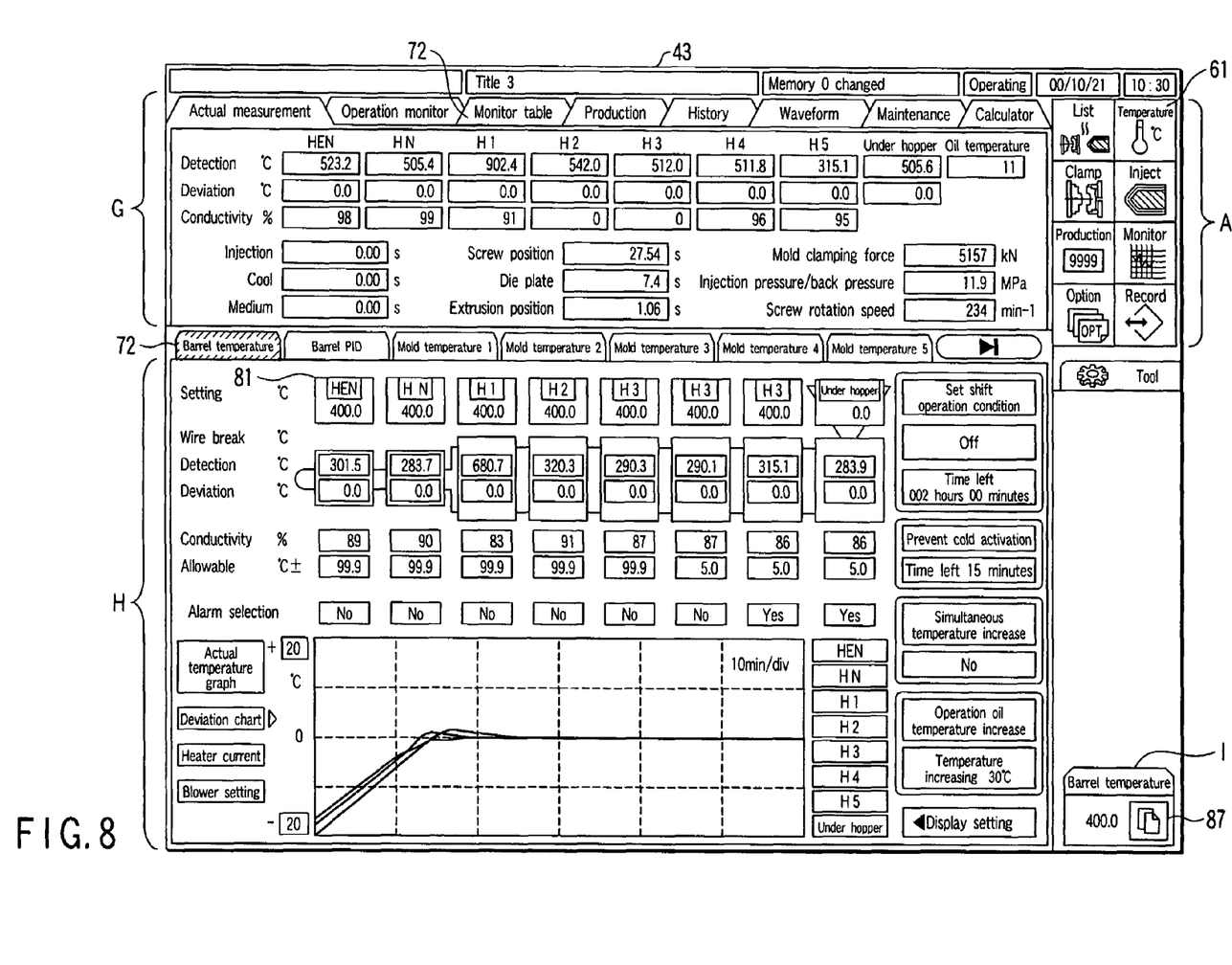
FIG. 8 is a diagram showing a changed screen when a copy button is touched in the display screen shown in FIG. 6.

For example, when the copy button 87 is touched while the display section 43 is displaying the display screen shown in FIG. 6, the HMI section 41 changes the display screen of the display section 43 to a copy mode screen shown in FIG. 8.

At this moment, the setting window I is displayed at the right corner of the display screen in reduced size. In this setting window I displayed at the right corner, icons of the barrel temperature and the copy button 87 are only displayed.

In this state, when it is desired to use a set value "400" displayed in the setting window I as a temperature other than the "Barrel temperature", for example, as a set temperature of the "Mold temperature 1" as well, an operator touches the pick switch in the set value display region 81 for the "Mold temperature 1".

The HMI section 41 temporarily stores the set value displayed in the setting window I into the buffer memory 562. Further, the HMI section 41 checks that the unit of the set value in the set value display region 81 for the "Mold temperature 1" is the same as the unit of the set value in the set value display region 81 for the "Barrel temperature" and that the set value in the set value display region 81 for the "Barrel temperature" is within an allowable range of the set value in the set value display region 81 for the "Mold temperature 1".

Thus, the HMI section 41 sends the set value temporarily stored in the buffer memory 562 to the main control section 31. The main control section 31 writes the received set value over the set value for the "Mold temperature 1".

In this manner, the set value "400" is written over in the region in the RAM of the main control section 31 where the set value for the "Mold temperature 1" is stored.

It is to be noted that when the "Mold temperature 2", "Mold temperature 3", . . . are also set to the same set value, the operator only has to sequentially touch the pick switches in the set value display region 81 for the "Mold temperature 2", "Mold temperature 3", . . . .

Thus, as long as the units are the same and the allowable range is satisfied, this control device can use one set value set in the setting window I to write it over another set value.

Therefore, when a large number of settings are required as in the temperature setting, this control device allows the set value to be set by copying without opening the setting window I each time, thereby making it possible to reduce the time required for the temperature setting.

It is to be noted that this control device can also use the set value "400" displayed in the setting window I as the temperature setting for other barrel zones.

Furthermore, in the copy mode screen in FIG. 8, if the copy button 87 in the setting window I is touched, the HMI section 41 cancels the copy mode screen.

Figure 9:
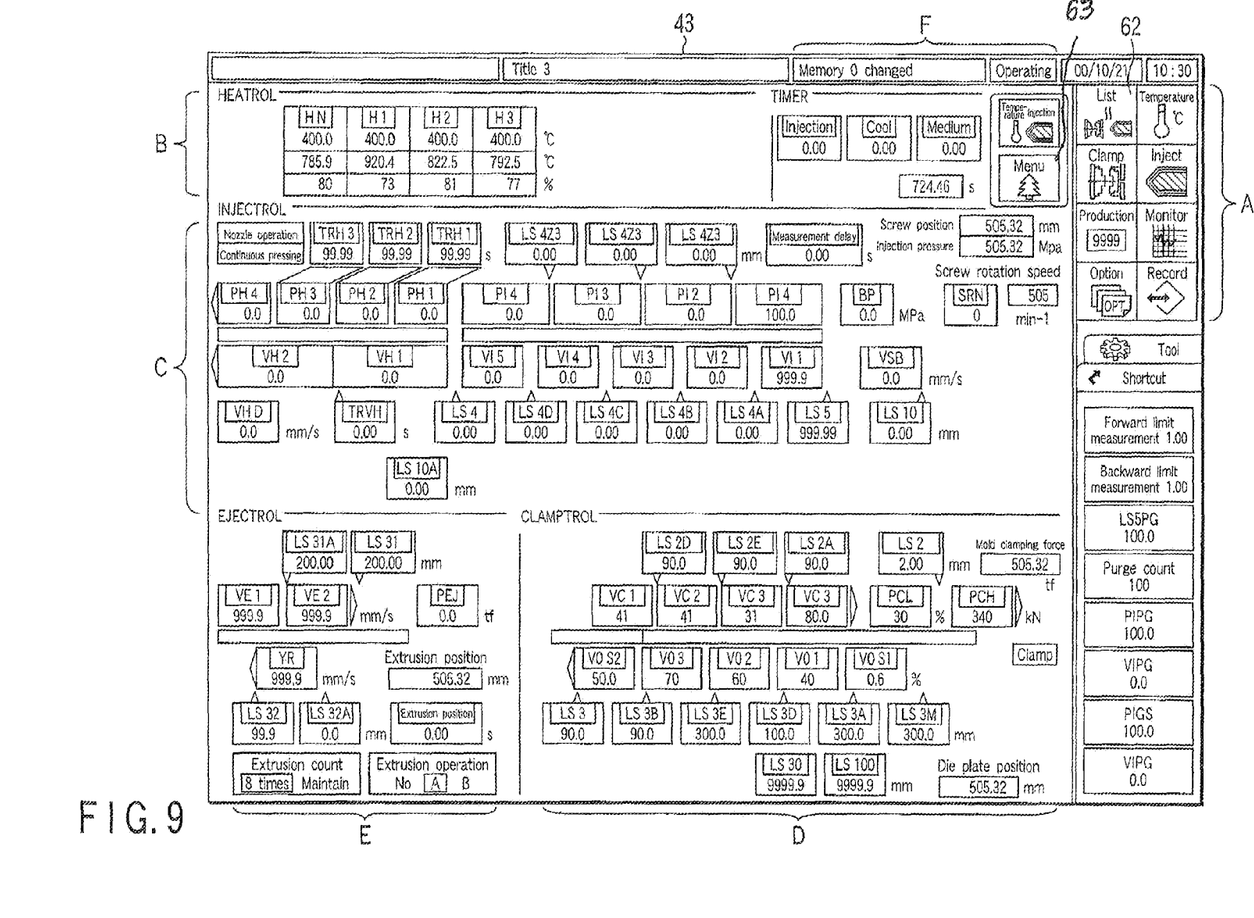
FIG. 9 is a diagram showing another display screen during the setting of the molding conditions in the display section in the embodiment.

FIG. 9 shows the display screen of the display section 43 after a "List" button 62 has been touched in the fixed region A of the display screen. This display screen is referred to as a list screen.

In this list screen, screens to set basic molding conditions are displayed in the same screen.

That is, this list screen displays a list of setting screens for a temperature setting (HEATROL) B, an injection measurement setting (INJECTROL) C, a clamp setting (CLAMPTROL) D, an extrusion setting (EJECTROL) E and a timer setting (TIMER) F. Each of the setting screens is a screen to set each of the basic molding conditions.

Therefore, the display section 43 can display the screens to set the basic molding conditions on the same screen, and allows the molding conditions to be set without changing the screen.

Figure 10:
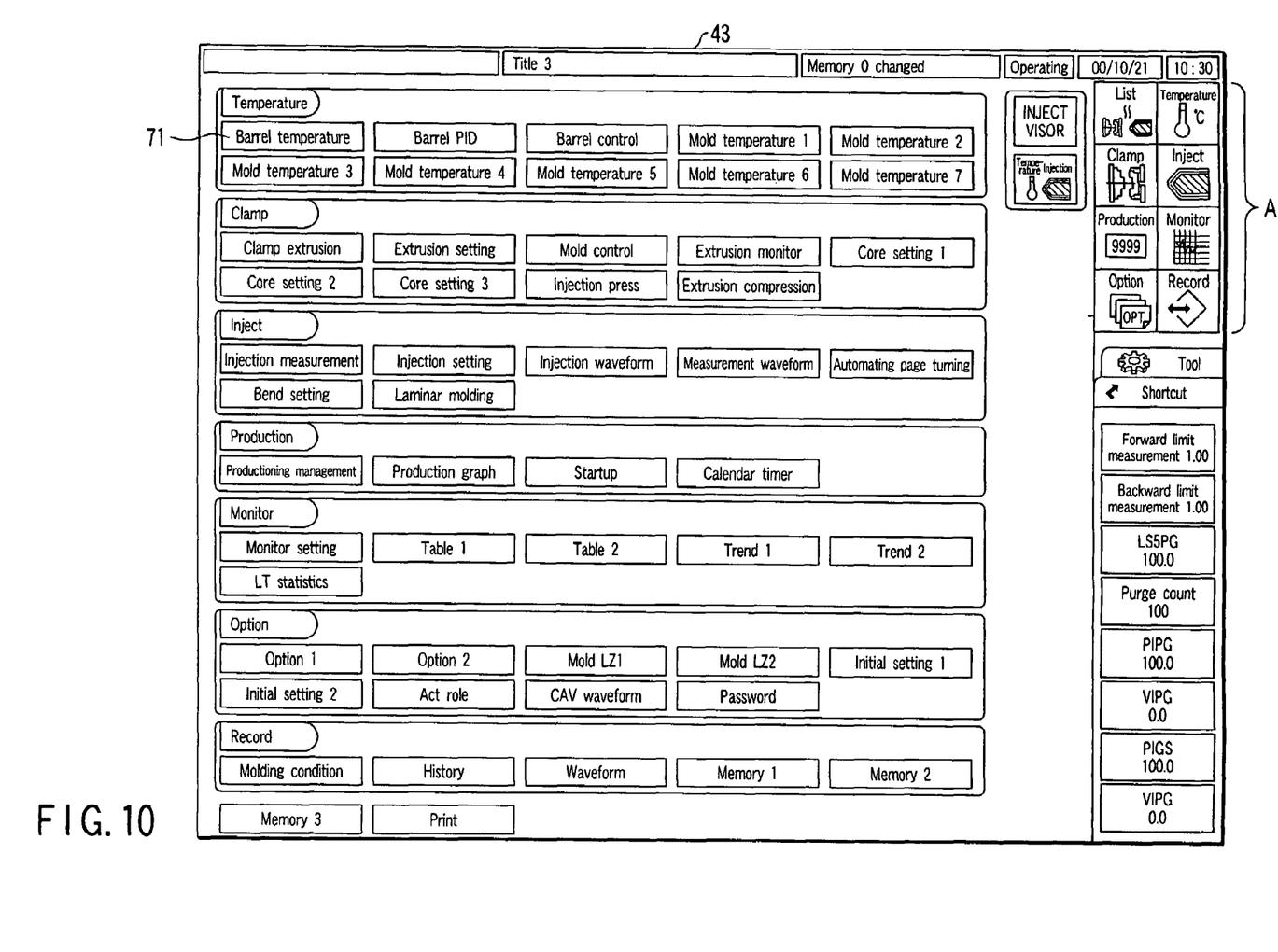
FIG. 10 is a diagram showing a changed screen when a menu button is touched in the display screen shown in FIG. 9.

Thus, it is possible for the HMI section 41 to eliminate the necessity of changing the screen in the display section 43 during the setting of the molding conditions. Next, in the screen of FIG. 9, if a "Menu" button 63 displayed at a portion adjacent to the fixed region A is touched, a menu screen shown in FIG. 10 is displayed.

In this menu screen, all screen configurations are displayed together item by item, such as "Temperature", "Clamp", "Inject", "Production", "Monitor", "Option" and "Record".

In this manner, since all the screen configurations are displayed together item by item, the operator can recognize by the display section 43 at a glance what kind of screens are in each item.

Furthermore, if a button in each of the items is operated, the screen thereof is displayed, so that the operator can have the target screen displayed in no time only by the operation of the button. Therefore, this control device can reduce the time of changing the screen of the display section 43.

Figure 11:
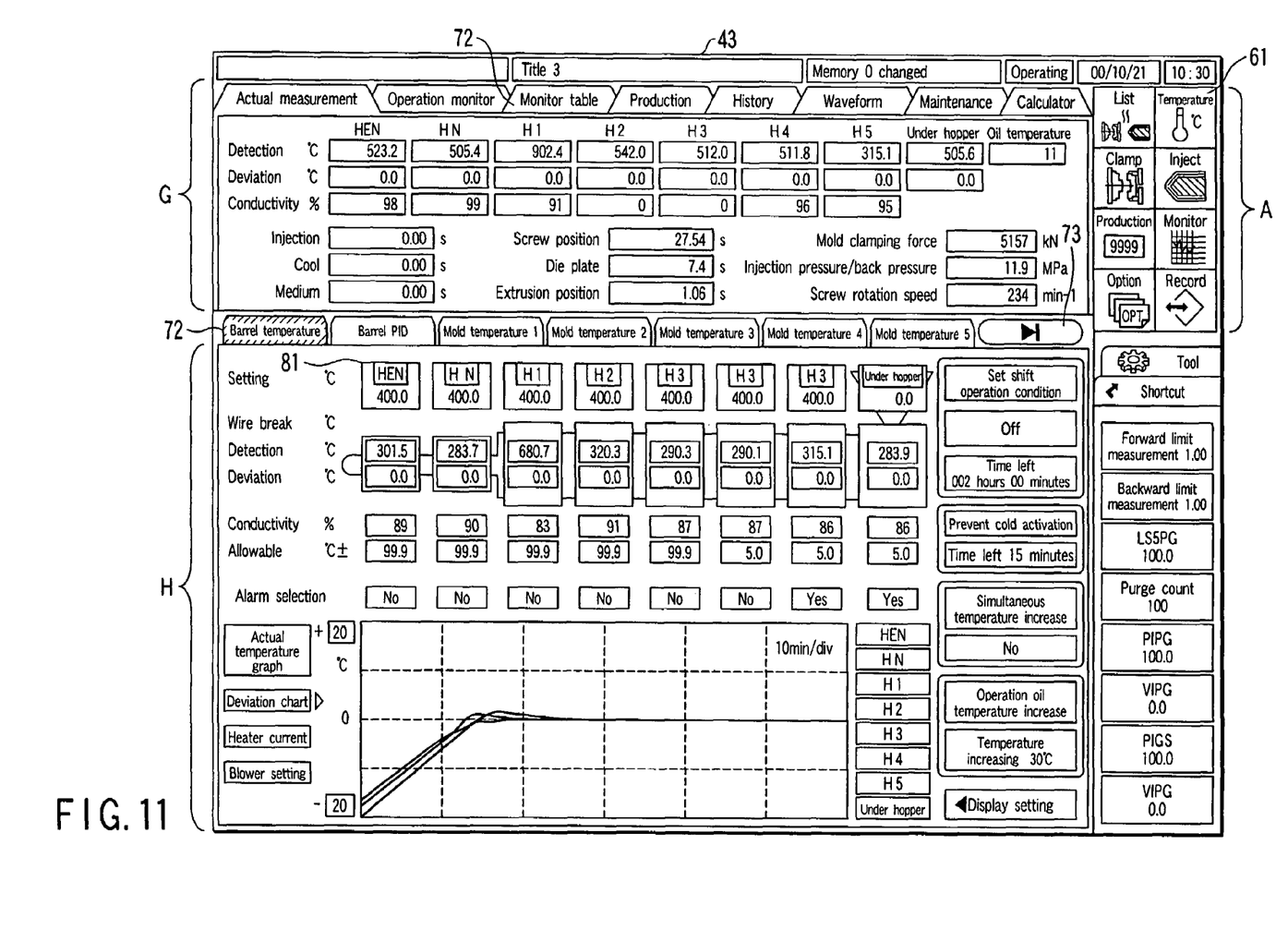
FIG. 11 is a diagram showing a changed screen when a barrel temperature button is touched in the display screen shown in FIG. 10.

For example, in the item "Temperature" in FIG. 10, if a "Barrel temperature" button 71 is touched, the display section 43 displays a temperature setting screen shown in FIG. 11. That is, the display section 43 displays, in the upper part thereof, the subscreen G to display the indications such as monitors, and in the lower part thereof, the main screen H to change the setting of the molding conditions. It further displays the tags 72 in the main screen H and the subscreen G.

The tags 72 that can be displayed in the main screen H are seven tags including the "Barrel temperature", "Barrel PID", "Mold temperature 1", "Mold temperature 2", . . . , "Mold temperature 5".

If there are a "Mold temperature 6" and a "Mold temperature 7", the tags of the "Mold temperature 6" and the "Mold temperature 7" are displayed in the next page.

Figure 12:
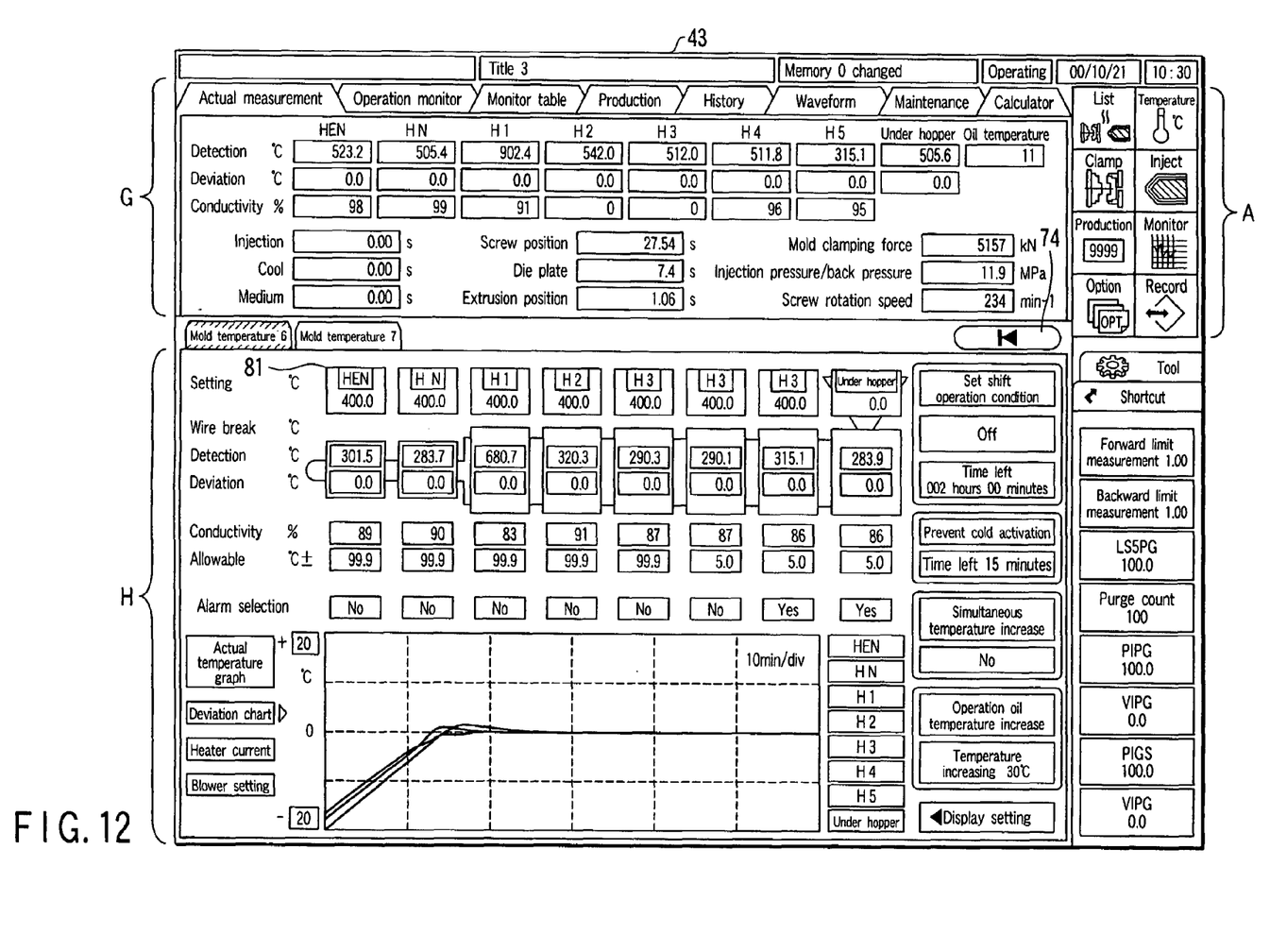
FIG. 12 is a diagram showing a changed screen when a next page key is touched in the display screen shown in FIG. 11.

A change to the next page is made with a next page key 73. That is, if the next page key 73 is touched, the next page is displayed in the main screen H as shown in FIG. 12. A return key 74 to return to the previous page is displayed in the main screen H of the next page.

In this manner, the tags 72 are also displayed in the screens constituting the main screen H and the subscreen G, so that the operator can immediately judge by the tags 72 where other screens are.

Furthermore, since the operator can change a screen to other screens by touching the tags 72, it is possible to significantly reduce the operation of setting the set value, for example, while changing the "Barrel temperature", the "Barrel PID", . . . etc. which constitute the main screen H.

After various setting operations are thus terminated, the operator starts an injection molding operation.

In the injection molding, the main control section 31 controls the temperature control section 47. The temperature control section 47 controls the heating temperature of the plurality of heaters. Thus, the synthetic resin material put from the hopper 2 into the barrel 3 melts.

Furthermore, when the molten resin is injected from the injection nozzle 5 of the barrel 3 and filled into the mold cavity 20, the sequence processing section 32 and the servo command section 33 are controlled.

First, the servo command section 33 controls the servo amplifier 37 to drive the measurement servomotor 17. The measurement servomotor 17 rotates and moves the injection screw 4 forward, and determining the amount of the molted resin to be injected from the barrel 3.

Next, the injection servomotor 6 is driven to rotate and further move the injection screw 4 forward. The injection screw 4 extrudes with its tip 4a the molten resin to the injection nozzle 5. The mold cavity 20 is thus filled with the molten resin injected from the injection nozzle 5 to the nozzle inlet 18a of the metal mold halves 18.

When the filling is finished, the device 19 to open/close and clamp the metal mold halves 18 is actuated to separate the metal mold halves 18 from the barrel 3. Then, the device 19 releases the metal mold halves 18. Thus, a molded product is taken from the metal mold halves 18.

In addition, while the above embodiment has been described with the example in which the set value in temperature setting is copied, similar processing can be performed when the set value other than the set value of the temperature is copied.

Moreover, the display section 43 provided separately from the HMI section 41 has been described in the above embodiment, but the display section 43 may be integrated with the HMI section 41.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A control device for use in an injection molding machine that melts synthetic resin material and injects a predetermined amount of molten synthetic resin material into a metal mold to obtain a molded product, comprising:

a display section in which a touch panel is disposed on a display screen; and a human-machine interface section equipped with a general-purpose operating system, the human-machine interface section being provided with at least a storage section to store set values which are various molding conditions for each mold article and a control section which controls the display of the display section, the human-machine interface section displaying, on the display section, a main screen to chance settings for the molding conditions stored in the storage section and a subscreen to display indications such as monitors, and also constantly displaying a change switch for a change of the screen in a fixed region of the display section, wherein the human-machine interface section includes:

a buffer memory which temporarily stores the set value;

means for opening a setting window having a copy button when a set value display region displayed in the display section is touched;

means for temporarily storing, in the buffer memory, the set value displayed in the setting window when the copy button provided in the opened setting window is touched; and means for copying the set value stored in the buffer memory as the set value in the set value display region to be touched next when the set value display region is touched in a case where the unit of the set value in the set value display region to be touched next is the same as the unit of the set value stored in the buffer memory and where the set value stored in the buffer memory is within an allowable range of the set value in the set value display region to be touched next.

2. The device according to claim 1, wherein the human-machine interface section controls the display of the display section to display screen changing tags on a screen forming the main screen and the subscreen.

3. The device according to claim 1, wherein the human-machine interface section controls the display of the display section to display all screen configurations together item by item, and when a button corresponding to each item is operated, the human-machine interface section changes to a screen corresponding to the button.

4. The device according to claim 1, wherein the human-machine interface section controls the display of the display section, and displays screens to set basic molding conditions among molding conditions on the same screen.

* * * * *